United States Patent
Yu et al.

(10) Patent No.: US 10,476,593 B2
(45) Date of Patent: *Nov. 12, 2019

(54) VISIBLE LIGHT-BASED COMMUNICATION METHOD AND TRANSPORT DEVICE

(71) Applicant: Huawei Technologies Co., Ltd., Shenzhen, Guangdong (CN)

(72) Inventors: Rongdao Yu, Shenzhen (CN); Maosheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,561

(22) Filed: Jul. 20, 2018

(65) Prior Publication Data

US 2018/0331758 A1 Nov. 15, 2018

Related U.S. Application Data

(63) Continuation of application No. 15/338,127, filed on Oct. 28, 2016, now Pat. No. 10,050,706, which is a
(Continued)

(30) Foreign Application Priority Data

Apr. 30, 2014 (CN) .......................... 2014 1 0182851

(51) Int. Cl.
| | |
|---|---|
| *H04B 10/116* | (2013.01) |
| *H04B 10/516* | (2013.01) |
| *H04B 10/40* | (2013.01) |
| *H04B 10/50* | (2013.01) |
| *H04B 10/60* | (2013.01) |
| *H04B 10/11* | (2013.01) |

(Continued)

(52) U.S. Cl.
CPC ......... *H04B 10/116* (2013.01); *H04B 10/516* (2013.01); *H04B 10/11* (2013.01); *H04B 10/112* (2013.01); *H04B 10/114* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 5,917,634 | A | 6/1999 | Otobe |
| 2010/0028021 | A1 | 2/2010 | Shimada et al. |
| 2015/0282211 | A1 | 10/2015 | Zhang et al. |

FOREIGN PATENT DOCUMENTS

| | | |
|---|---|---|
| CN | 101419069 A | 4/2009 |
| CN | 102013174 A | 4/2011 |

(Continued)

*Primary Examiner* — Darren E Wolf
(74) *Attorney, Agent, or Firm* — Leydig, Voit & Mayer, Ltd.

(57) ABSTRACT

The present invention discloses a communication method that is based on a visible light source and a transport device. In the solution, before a visible light signal is generated, related information carried in the visible light signal is processed by using orthogonal sequences, and different visible light signals processed by using the orthogonal sequences do not interfere with each other. In this way, even if an optical receiving device receives multiple visible light signals, because the received multiple visible light signals are orthogonal to each other, the visible light signals can be accurately received.

21 Claims, 6 Drawing Sheets

Related U.S. Application Data continuation of application No. PCT/CN2014/088658, filed on Oct. 15, 2014.

(51) Int. Cl.
 *H04B 10/112* (2013.01)
 *H04B 10/114* (2013.01)

(56) References Cited

FOREIGN PATENT DOCUMENTS

| | | |
|---|---|---|
| CN | 201784621 U | 4/2011 |
| CN | 102244635 A | 11/2011 |
| CN | 103097858 A | 5/2013 |
| DE | 10147274 B4 | 12/2005 |

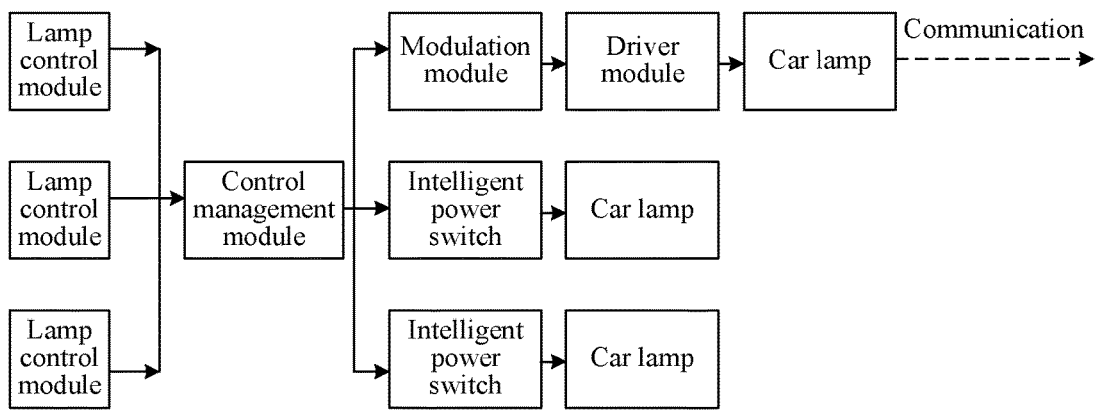

FIG. 1C

200
Receive a visible light signal sent by a transport device and demodulate the visible light signal, where the demodulated visible light signal carries related information, which has been processed by using orthogonal sequences, of the transport device 210
Process the demodulated visible light signal by using the orthogonal sequences, to obtain, by means of demodulation, the related information of the transport device carried in the visible light signal, where the related information includes one of or any combination of performance information of the transport device, size information of the transport device, and identifier information of a visual light source of the transport device

FIG. 2A

VISIBLE LIGHT-BASED COMMUNICATION METHOD AND TRANSPORT DEVICE

CROSS-REFERENCE TO RELATED APPLICATION

This application is a continuation of U.S. application Ser. No. 15/338,127, filed on Oct. 28, 2016, which is a continuation of International Application No. PCT/CN2014/088658, filed on Oct. 15, 2014, which claims priority to Chinese Patent Application No. 201410182851.2, filed on Apr. 30, 2014, the disclosures of the aforementioned applications are hereby incorporated by reference in their entireties.

TECHNICAL FIELD

The present invention relates to the field of communications processing technologies, and in particular, to a visible light-based communication method and a transport device.

BACKGROUND

The visible light communications technology is a brand new wireless communications technology that emerges in recent years, in which a light source performs communication while emitting light, and therefore, the light source not only can implement a lighting function, but also can implement a communication function. Compared with a conventional radio-frequency communications technology and other wireless optical communications technologies, the visible light communications technology has advantages such as high transmit power, not occupying a radio spectrum, no electromagnetic interference, no electromagnetic radiation, and saving energy and resources. Therefore, the visible light communications technology has become increasingly important.

Currently, researches on applications of the visible light communications technology mainly focus on indoor transport devices and outdoor visible light intelligent transport devices. When a visible light intelligent transport device performs communication by using visible light, the communication relies on precision of a visible light receiver rather than human eyes to recognize a device in which a visible light transmitter nearby is located. Therefore, when used in a transport system, the transport device can effectively avoid a potential safety hazard. For example, under a hazy weather with a visibility of only 100 meters, a driver of a vehicle A cannot recognize, with naked eyes, a vehicle B located 500 meters ahead of the vehicle A. In this case, the driver of the vehicle A may recognize the vehicle B by using a transport device.

However, the foregoing method has the following disadvantages: When a transport device simultaneously receives multiple visible light signals, because interference occurs between the multiple visible light signals, the transport device cannot accurately receive the visible light signals. For example, there are three vehicles that are 500 meters away from the vehicle A in different directions: a vehicle B, a vehicle C, and a vehicle D, and the three vehicles each send a visible light signal to the vehicle A simultaneously. Because the three visible light signals interfere with each other, none of the visible light signals can be accurately received by the vehicle A.

SUMMARY

Embodiments of the present invention provide a visible light-based communication method and a transport device, to resolve a problem in the prior art that visible light signals cannot be accurately received due to interference between multiple visible light signals.

Specific technical solutions provided by the embodiments of the present invention are as follows:

According to a first aspect, a visible light-based communication method is provided, including:

acquiring related information of a transport device, where the related information includes one of or any combination of performance information of the transport device, size information of the transport device, or identifier information of a visual light source of the transport device;

processing the related information by using orthogonal sequences, to obtain processed related information;

modulating the processed related information to a visible light signal, so that the information is added to the visible light signal for transmission, and a transport device receiving the processed related information obtains, by means of demodulation based on orthogonality between the orthogonal sequences, the related information carried in the visible light signal, thereby canceling interference between multiple visible light signals; and sending the visible light signal carrying the processed related information.

With reference to the first aspect, in a first possible implementation manner, the processing the related information by using orthogonal sequences specifically includes:

scrambling the related information by using the orthogonal sequences; or mapping the related information into the orthogonal sequences.

With reference to the first aspect or the first possible implementation manner of the first aspect, in a second possible implementation manner, the orthogonal sequences are generated based on a cyclic shift of a basic sequence.

With reference to the second possible implementation manner of the first aspect, in a third possible implementation manner, a form of the basic sequence is as follows:

$$m(k) = \exp\left(\frac{j\pi r k^2}{N}\right)$$

where m(k) is the basic sequence;
N is a length of the basic sequence and is a positive integer;
k is any integer from 0 to N;
j is an imaginary unit; and
r is any positive integer co-prime to N.

With reference to the second or third possible implementation manner of the first aspect, in a fourth possible implementation manner, any one of the orthogonal sequences satisfies the following relationship with the basic sequence:

$$\sum_{k=0}^{N-1} m(k)m^*(k+\sigma)_{modN} = \begin{Bmatrix} N, \sigma = 0 \\ 0, \sigma \neq 0 \end{Bmatrix}$$

where m(k) is the basic sequence, and $m^*(k+\sigma)$ represents the orthogonal sequences;
N is a length of the basic sequence and is a positive integer;
k is any integer from 0 to N;
j is an imaginary unit; and
r is any positive integer co-prime to N.

With reference to the first aspect or the first to fourth possible implementation manners of the first aspect, in a fifth possible implementation manner, the modulating the processed related information to a visible light signal specifically includes:

modulating the processed related information to the visible light signal by using an on-off keying modulation scheme; or modulating the processed related information to the visible light signal by using a pulse position modulation scheme; or modulating the processed related information to the visible light signal by using a multi-carrier modulation scheme.

With reference to the first aspect or the first to fifth possible implementation manners of the first aspect, in a sixth possible implementation manner, the sending the visible light signal carrying the processed related information specifically includes:

sending the visible light signal carrying the processed related information, so that the transport device receiving the visible light signal calculates a distance between two transport devices according to the related information and by using the following formula:

$$S = \sqrt{L^2 - (H2 - H1)^2} = \sqrt{S_2^2 - \left(\frac{B2-B1}{2}\right)^2 - \left(\frac{S_2^2 - S_1^2}{2(B2-B1)}\right)^2 - (H2-H1)^2}$$

where B1 is a width between left and right tail lamps of a transport device sending the visible light signal;

H1 is a height, relative to the ground, of the tail lamps of the transport device sending the visible light signal;

B2 is a width (B2>B1) between width lamps of the transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

According to a second aspect, a visible light-based communication method is provided, including:

receiving a visible light signal sent by a transport device and demodulating the visible light signal, where the demodulated visible light signal carries related information, which has been processed by using orthogonal sequences, of the transport device; and processing the demodulated visible light signal by using the orthogonal sequences, to obtain, by means of demodulation, the related information of the transport device carried in the visible light signal, where the related information includes one of or any combination of performance information of the transport device, size information of the transport device, or identifier information of a visual light source of the transport device.

With reference to the second aspect, in a first possible implementation manner, the demodulating the visible light signal specifically includes:

demodulating the visible light signal by using an on-off keying modulation scheme; or demodulating the visible light signal by using a pulse position modulation scheme; or demodulating the visible light signal by using a multi-carrier modulation scheme.

With reference to the second aspect or the first possible implementation manner of the second aspect, in a second possible implementation manner, the processing the demodulated visible light signal by using the orthogonal sequences specifically includes:

descrambling the demodulated visible light signal by using the orthogonal sequences; or demapping the demodulated visible light signal by using the orthogonal sequences.

With reference to the first or second possible implementation manner of the second aspect, in a third possible implementation manner, the orthogonal sequences are generated based on a cyclic shift of a basic sequence.

With reference to the third possible implementation manner of the second aspect, in a fourth possible implementation manner, a form of the basic sequence is as follows:

$$m(k) = \exp\left(\frac{j\pi r k^2}{N}\right)$$

where m(k) is the basic sequence;

N is a length of the basic sequence and is a positive integer;

k is any integer from 0 to N;

j is an imaginary unit; and r is any positive integer co-prime to N.

With reference to the second aspect or the first to fourth possible implementation manners of the second aspect, in a fifth possible implementation manner, any one of the orthogonal sequences satisfies the following relationship with the basic sequence:

$$\sum_{k=0}^{N-1} m(k) m^*(k+\sigma)_{modN} = \begin{Bmatrix} N, \sigma = 0 \\ 0, \sigma \neq 0 \end{Bmatrix}$$

where m(k) is the basic sequence, and m*(k+σ) represents the orthogonal sequences;

N is a length of the basic sequence and is a positive integer;

k is any integer from 0 to N;

j is an imaginary unit; and r is any positive integer co-prime to N.

With reference to the second aspect or the first to fifth possible implementation manners of the second aspect, in a sixth possible implementation manner, after the related information of the transport device carried in the visible light signal is obtained by means of demodulation, the method further includes:

calculating a distance between two transport devices according to the related information and by using the following formula:

$$S = \sqrt{L^2 - (H2-H1)^2} = \sqrt{S_2^2 - \left(\frac{B2-B1}{2}\right)^2 - \left(\frac{S_2^2 - S_1^2}{2(B2-B1)}\right)^2 - (H2-H1)^2}$$

where B1 is a width between left and right tail lamps of the transport device sending the visible light signal;

H1 is a height, relative to the ground, of the tail lamps of the transport device sending the visible light signal;

B2 is a width (B2>B1) between width lamps of a transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

With reference to the second aspect or the first to sixth possible implementation manners of the second aspect, in a seventh possible implementation manner, after the related information of the transport device carried in the visible light signal is obtained by means of demodulation, the method further includes:

if the related information is brake-lamp lamp information, decelerating; or if the related information is emergency-flashers information, decelerating, and/or, triggering emergency flashers of the local transport device to turn on and sending a visible light signal carrying emergency-flashers lamp information.

According to a third aspect, a transport device is provided, including:

an acquiring module, configured to acquire related information of a transport device, where the related information includes one of or any combination of performance information of the transport device, size information of the transport device, or identifier information of a visual light source of the transport device;

a processing module, configured to process the related information by using orthogonal sequences, to obtain processed related information;

a modulation module, configured to modulate the processed related information to a visible light signal, so that the information is added to the visible light signal for transmission, and a transport device receiving the processed related information obtains, by means of demodulation based on orthogonality between the orthogonal sequences, the related information carried in the visible light signal, thereby canceling interference between multiple visible light signals; and a sending module, configured to send the visible light signal carrying the processed related information.

With reference to the third aspect, in a first possible implementation manner, the processing module is specifically configured to:

scramble the related information by using the orthogonal sequences; or map the related information into the orthogonal sequences.

With reference to the third aspect or the first possible implementation manner of the third aspect, in a second possible implementation manner, the orthogonal sequences used by the processing module for processing are generated based on a cyclic shift of a basic sequence.

With reference to the second possible implementation manner of the third aspect, in a third possible implementation manner, the orthogonal sequences used by the processing module for processing are generated by using the basic sequence that is in the following form:

$$m(k) = \exp\left(\frac{j\pi rk^2}{N}\right)$$

where m(k) is the basic sequence;

N is a length of the basic sequence and is a positive integer;

k is any integer from 0 to N;

j is an imaginary unit; and r is any positive integer co-prime to N.

With reference to the second or third possible implementation manner of the third aspect, in a fourth possible implementation manner, any one of the orthogonal sequences used by the processing module for processing satisfies the following relationship with the basic sequence:

$$\sum_{k=0}^{N-1} m(k)m^*(k+\sigma)_{modN} = \begin{Bmatrix} N, \sigma = 0 \\ 0, \sigma \neq 0 \end{Bmatrix}$$

where m(k) is the basic sequence, and m*(k+σ) represents the orthogonal sequences;

N is a length of the basic sequence and is a positive integer;

k is any integer from 0 to N;

j is an imaginary unit; and r is any positive integer co-prime to N.

With reference to the third aspect or the first to fourth possible implementation manners of the third aspect, in a fifth possible implementation manner, the modulation module is specifically configured to:

modulate the processed related information to the visible light signal by using an on-off keying modulation scheme; or, modulate the processed related information to the visible light signal by using a pulse position modulation scheme; or modulate the processed related information to the visible light signal by using a multi-carrier modulation scheme.

With reference to the third aspect or the first to fifth possible implementation manners of the third aspect, in a sixth possible implementation manner, the sending module is specifically configured to:

send the visible light signal carrying the processed related information, so that the transport device receiving the visible light signal calculates a distance between two transport devices according to the related information and by using the following formula:

$$S = \sqrt{L^2 - (H2 - H1)^2} = \sqrt{S_2^2 - \left(\frac{B2 - B1}{2}\right)^2 - \left(\frac{S_2^2 - S_1^2}{2(B2 - B1)}\right)^2 - (H2 - H1)^2}$$

where B1 is a width between left and right tail lamps of a transport device sending the visible light signal;

H1 is a height, relative to the ground, of the tail lamps of the transport device sending the visible light signal;

B2 is a width (B2>B1) between width lamps of the transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

According to a fourth aspect, a visible light-based communication transport device is provided, including:

a visible light receiving module, configured to receive a visible light signal sent by a transport device and demodulate the visible light signal, where the demodulated visible light signal carries related information, which has been processed by using orthogonal sequences, of the transport device; and a processing module, configured to process the demodulated visible light signal by using the orthogonal sequences, to obtain, by means of demodulation, the related information of the transport device carried in the visible light signal, where the related information includes one of or any combination of performance information of the transport device, size information of the transport device, or identifier information of a visual light source of the transport device.

With reference to the fourth aspect, in a first possible implementation manner, the visible light receiving module is specifically configured to:

demodulate the visible light signal by using an on-off keying modulation scheme; or demodulate the visible light signal by using a pulse position modulation scheme; or demodulate the visible light signal by using a multi-carrier modulation scheme.

With reference to the fourth aspect or the first possible implementation manner of the fourth aspect, in a second possible implementation manner, the processing module is specifically configured to:

descramble the demodulated visible light signal by using the orthogonal sequences; or demap the demodulated visible light signal by using the orthogonal sequences.

With reference to the first or second possible implementation manner of the fourth aspect, in a third possible implementation manner, the orthogonal sequences used by the processing module for processing are generated based on a cyclic shift of a basic sequence.

With reference to the third possible implementation manner of the fourth aspect, in a fourth possible implementation manner, the orthogonal sequences used by the processing module for descrambling are generated by using the basic sequence that is in the following form:

$$m(k) = \exp\left(\frac{j\pi r k^2}{N}\right)$$

where m(k) is the basic sequence;

N is a length of the basic sequence and is a positive integer;

k is any integer from 0 to N;

j is an imaginary unit; and r is any positive integer co-prime to N.

With reference to the fourth aspect or the first to fourth possible implementation manners of the fourth aspect, in a fifth possible implementation manner, any one of the orthogonal sequences used by the processing module for processing satisfies the following relationship with the basic sequence:

$$\sum_{k=0}^{N-1} m(k)m^*(k+\sigma)_{modN} = \begin{cases} N, \sigma = 0 \\ 0, \sigma \neq 0 \end{cases}$$

where m(k) is the basic sequence, and m*(k+σ) represents the orthogonal sequences;

N is a length of the basic sequence and is a positive integer;

k is any integer from 0 to N;

j is an imaginary unit; and r is any positive integer co-prime to N.

With reference to the fourth aspect or the first to fifth possible implementation manners of the fourth aspect, in a sixth possible implementation manner, the communication transport device further includes a distance calculation module, where the distance calculation module is specifically configured to:

calculate a distance between two transport devices according to the related information and by using the following formula:

$$S = \sqrt{L^2 - (H2 - H1)^2} = \sqrt{S_2^2 - \left(\frac{B2 - B1}{2}\right)^2 - \left(\frac{S_2^2 - S_1^2}{2(B2 - B1)}\right)^2 - (H2 - H1)^2}$$

where B1 is a width between left and right tail lamps of the transport device sending the visible light signal;

H1 is a height, relative to the ground, of the tail lamps of the transport device sending the visible light signal;

B2 is a width (B2>B1) between width lamps of a transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

With reference to the fourth aspect or the first to sixth possible implementation manners of the fourth aspect, in a seventh possible implementation manner, the communication transport device further includes a control management module, where the control management module is configured to:

if the related information obtained by means of demodulation is brake-lamp lamp information, control the transport device to decelerate; or if the related information obtained by means of demodulation is emergency-flashers information, control the transport device to decelerate, and/or, trigger emergency flashers to turn on and send a visible light signal carrying emergency-flashers lamp information.

The beneficial effects of the present invention are as follows:

In the prior art, when a transport device simultaneously receives multiple visible light signals, because multiple visible light signals interfere with each other, the transport device cannot accurately receive the visible light signals. Therefore, there is a problem that the visible light signals cannot be accurately received. However, in the embodiments of the present invention, before a visible light signal is generated, related information carried in the visible light signal is processed by using orthogonal sequences, and different visible light signals processed by using the orthogonal sequences do not interfere with each other. In this way, when a transport device having an optical receiving device receives multiple visible light signals, because the received multiple visible light signals are orthogonal to each other, even if the orthogonal multiple visible light signals interfere with each other, the transport device receiving the multiple visible light signals may obtain, by means of demodulation based on orthogonality between the orthogonal sequences, related information carried in the multiple light signals, thereby canceling interference. Therefore, visible light signals can be accurately received, which resolves a problem in the prior art that visible light signals cannot be accurately received due to interference between multiple visible light signals.

BRIEF DESCRIPTION OF THE DRAWINGS

FIG. 1C is another modular schematic diagram of an entity for executing visible light-based communication according to an embodiment of the present invention;

FIG. 2A is a flowchart of another method for visible light-based communication according to an embodiment of the present invention;

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the embodiments of the present invention, a communication method based on a visible light source is provided. The method includes: acquiring related information of a transport device, where the related information includes one of or any combination of performance information of the transport device, size information of the transport device, or identifier information of a visual light source of the transport device; processing the related information by using orthogonal sequences, to obtain processed related information; modulating the processed related information to a visible light signal, so that the information is added to the visible light signal for transmission, and a transport device receiving the processed related information obtains, by means of demodulation based on orthogonality between the orthogonal sequences, the related information carried in the visible light signal, thereby canceling interference between multiple visible light signals; and sending the visible light signal carrying the processed related information. In this way, when a transport device receives multiple visible light signals, because the received multiple visible light signals are orthogonal to each other, even if the orthogonal multiple visible light signals interfere with each other, the transport device receiving the multiple visible light signals may obtain, by means of demodulation based on orthogonality between the orthogonal sequences, the related information carried in the multiple light signals, thereby canceling interference. Therefore, visible light signals can be accurately received, which resolves a problem in the prior art that visible light signals cannot be accurately received due to interference between multiple visible light signals.

The following describes preferred implementation manners of the present invention in detail with reference to the accompanying drawings.

Figure 1A:
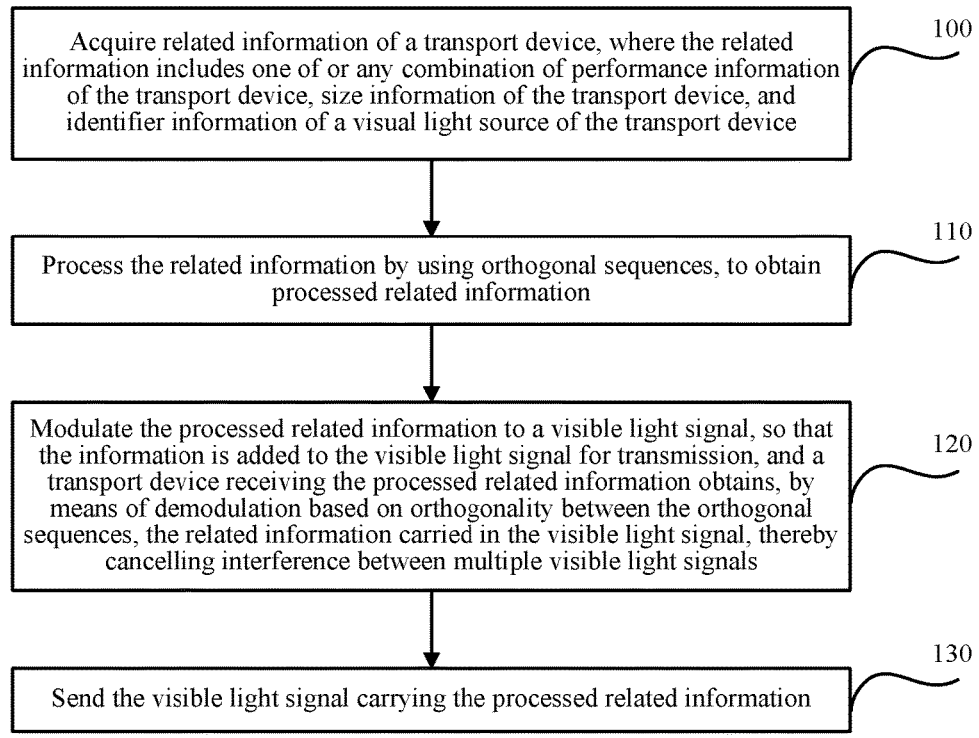
FIG. 1A is a flowchart of a method for visible light-based communication according to an embodiment of the present invention.

Referring to FIG. 1A, an embodiment of the present invention provides a communication method based on a visible light source. A specific process of the method is as follows:

Step 100: Acquire related information of a transport device, where the related information includes one of or any combination of performance information of the transport device, size information of the transport device, or identifier information of a visual light source of the transport device.

Step 110: Process the related information by using orthogonal sequences, to obtain processed related information.

Step 120: Modulate the processed related information to a visible light signal, so that the information is added to the visible light signal for transmission, and a transport device receiving the processed related information obtains, by means of demodulation based on orthogonality between the orthogonal sequences, the related information carried in the visible light signal, thereby canceling interference between multiple visible light signals.

Step 130: Send the visible light signal carrying the processed related information.

In this embodiment of the present invention, an entity for executing step 100 to step 130 may be in a form of a transport device, for example, a car.

The following provides a description by using an example in which the transport device is a car. Certainly, in actual applications, there are also transport devices of other forms, which are not described in detail herein.

An existing car lamp system includes a car lighting system and a car lamp visible light signal system. The car lighting system provides driving with lighting when the visibility is relatively low, and mainly includes a headlamp, fog lamps (front and rear), a license plate lamp, and the like. The car lamp visible light signal system is used to convey information about a car to the outside and is used for prompting and warning. The car lamp visible light signal system includes brake lamps, turn lamps (front and rear), width lamps and tail lamps (rear lamps), reversing lamps, hazard warning signal lamps, and the like.

Existing car lamps are mainly used to convey simple information such as braking a car and turning. In addition, the information can be recognized by only human eyes, and there is a potential safety hazard caused by relatively slow human-eye recognition or by bad weather or poor visibility. The present invention implements communication between cars by means of visible light communication. Information such as lamp information and car speed information is carried by using visible light of a car lamp, thereby implementing automatic communication between cars and further avoiding a potential safety hazard caused by relatively slow human-eye recognition or by bad weather or poor visibility.

For example, a car A has four lamps: a lamp 1, a lamp 2, a lamp 3, and a lamp 4. A visible light signal transmitted by each lamp carries some related information, and without processing by using orthogonal sequences, interference occurs between light signals sent out by different lamps. A car B that receives the visible light signals cannot accurately obtain, by means of demodulation, the related information carried in the light signal sent out by each lamp. There is a problem that visible light signals cannot be accurately received.

In this embodiment of the present invention, the related information of the transport device has multiple forms. Optionally, the related information may be in the following form:

including one of or any combination of performance information of the transport device, size information of the transport device, or identifier information of a visual light source of the transport device.

For example, the related information includes lamp information of the transport device, speed information of the transport device, acceleration information of the transport device, and length information, width information, height information, fuel capacity information, and the like of the transport device.

Certainly, the lamp information of the transport device may be ID information of a lamp of the transport device, or may be sequence information corresponding to ID information of a lamp of the transport device. A correspondence among the lamp information, ID information, and sequence information is shown in Table 1:

TABLE 1

Correspondence among lamp information, ID information, and sequence information of a transport device

| ID | Lamp | Sequence |
|----|------|----------|
| 1 | brake lamp | $m_1 \{m_{1,1}m_{1,2}, m_{1,3}, \ldots m_{1,N-1}, m_{1,N}\}$ |
| 2 | reversing lamp | $m_2 \{m_{2,1}m_{2,2}, m_{2,3}, \ldots m_{2,N-1}, m_{2,N}\}$ |
| 3 | left tail lamp | $m_3 \{m_{3,1}m_{3,2}, m_{3,3}, \ldots m_{3,N-1}, m_{3,N}\}$ |
| 4 | right tail lamp | $m_4 \{m_{4,1}m_{4,2}, m_{4,3}, \ldots m_{4,N-1}, m_{4,N}\}$ |
| 5 | left turn lamp | $m_5 \{m_{5,1}m_{5,2}, m_{5,3}, \ldots m_{5,N-1}, m_{5,N}\}$ |
| 6 | right turn lamp | $m_6 \{m_{6,1}m_{6,2}, m_{6,3}, \ldots m_{6,N-1}, m_{6,N}\}$ |

For example, to avoid an accident such as a collision with the car B behind, communication is performed by using visible light of a rear lamp of the car A.

Step A: The car A determines brake lamp information of the car A.

Step B: The car A processes the brake lamp information by using orthogonal sequences and modulates processed brake lamp information to a visible light signal.

Step C: The car A sends the visible light signal by using a lamp of rear lamps of the car A.

Certainly, in actual applications, an implementation process of communicating with the car A by a front lamp of the car B is similar to the foregoing process, and details are not described herein again.

In actual applications, because multiple visible light sources (for example, lamps) simultaneously send multiple signals, when a transport device having an optical receiver receives the multiple signals, interference occurs between the multiple signals, which results in that the transport device having the optical receiver cannot accurately receive the visible light signals, and therefore, the transport device cannot accurately obtain, by means of demodulation, information carried in the visible light signals. Therefore, in this embodiment of the present invention, to cancel interference between different visible light signals, the related information is processed by using orthogonal sequences, where any two orthogonal sequences satisfy a relationship shown in formula one:

$$m_n * m_k^* = \sum_{i=1}^{N} m_{n,1} * m_{k,i}^* (n \neq k) = 0 \qquad \text{(formula one)}$$

where both n and k are sequence numbers, and i is an element index in either of the sequences;

N is a length of either of the sequences; and $m_{k,i}^*$ is a conjugate of an $i^{th}$ element in a sequence $m_k$, and $m_{n,i}$ is an $i^{th}$ element in a sequence $m_n$.

In this embodiment of the present invention, based on these sequences that are orthogonal to each other, or by separately processing different visible light signals by using these sequences that are orthogonal to each other, the multiple visible light signals can transmit information in a parallel manner by using visible light, thereby improving a data transmission rate.

In this embodiment of the present invention, there are multiple manners of processing the related information by using orthogonal sequences. Optionally, the following manner may be used:

scrambling the related information by using the orthogonal sequences; or mapping the related information into the orthogonal sequences; and certainly, there are also other implementation manners, which are not described in detail herein.

In this embodiment of the present invention, the orthogonal sequences have multiple forms. Optionally, the orthogonal sequences are generated based on a cyclic shift of a basic sequence. Certainly, the orthogonal sequences may also be in other forms, which are not described in detail herein.

In this embodiment of the present invention, if the orthogonal sequences are generated based on a cyclic shift of a basic sequence, the form of the basic sequence is shown in formula two:

$$m(k) = \exp\left(\frac{j\pi rk^2}{N}\right) \qquad \text{(formula two)}$$

where m(k) is the basic sequence;

N is a length of the basic sequence and is a positive integer;

k is any integer from 0 to N;

j is an imaginary unit; and r is any positive integer co-prime to N.

In this embodiment of the present invention, any one of the orthogonal sequences satisfies the following relationship with the basic sequence:

$$\sum_{k=0}^{N-1} m(k)m^*(k+\sigma)_{modN} = \begin{Bmatrix} N, \sigma = 0 \\ 0, \sigma \neq 0 \end{Bmatrix} \qquad \text{(formula three)}$$

where m(k) is the basic sequence, and m*(k+σ) represents the orthogonal sequences;

N is a length of the basic sequence and is a positive integer;

k is any integer from 0 to N;

j is an imaginary unit; and r is any positive integer co-prime to N.

In this embodiment of the present invention, there are multiple manners of modulating the processed related information to a visible light signal. Optionally, the following manner may be used:

modulating the processed related information to the visible light signal by using an on-off keying modulation scheme; or modulating the processed related information to the visible light signal by using a pulse position modulation scheme; or modulating the processed related information to the visible light signal by using a multi-carrier modulation scheme.

Certainly, in actual applications, there are also other implementation manners, which are not described in detail herein.

In this embodiment of the present invention, if each lamp corresponds to one sequence, other information may be carried based on the sequence corresponding to the lamp, for example, speed information, acceleration information, information about a width between left and right tail lamps, and a distance of a tail lamp to the ground of a car.

As shown in Table 1, when a brake lamp is turned on, a speed v of a car is loaded to a sequence $m_1$ corresponding to the brake lamp, as shown in formula four:

$$v \cdot m_1 = \{v \cdot m_{1,1}, v \cdot m_{1,2}, v \cdot m_{1,3}, \ldots v \cdot m_{1,N-1}, v \cdot m_{1,N}\} \qquad \text{(formula four)}$$

Because the sequence $m_1$ corresponding to the brake lamp are orthogonal to sequences of tall other lamps, the sequence $m_1$ in which other information has been loaded is still orthogonal to the other sequences. In this way, when receiving a visible light signal carrying information about the sequence $m_1$, another car not only knows that a car sending the visible light signal brakes but also knows a current speed of the car sending the visible light signal. A proper accelerating or decelerating measure may be used according to a current speed of the car sending the visible light signal and a current speed of the car receiving the visible light signal.

In this embodiment of the present invention, different related information may be transmitted by using a same visible light source, or may be transmitted by using different visible light sources, that is, different related information may be transmitted by using a same lamp, or may be transmitted by using different lamps.

For example, a lamp 1 of a car transmits speed information, acceleration information, and fuel capacity information of the car by using a visible light signal; or, a lamp 1 of a car transmits speed information of the car by using a visible light signal, a lamp 2 of the car transmits acceleration information of the car by using a visible light signal, and a lamp 3 of the car transmits fuel capacity information of the car by using a visible light signal. In this way, at the same moment, the speed information, acceleration information, and fuel capacity information of the car can be simultaneously transmitted by using the three lamps, thereby improving a transmission rate of communication between cars.

In this embodiment of the present invention, when multiple visible light signals are transmitted by using one visible light source, to avoid interference between the multiple visible light signals, related information needs to be processed by using orthogonal sequences, to prevent the visible light signals carrying related information from interfering with each other. Before the visible light signals are modulated, orthogonal sequences are added, and then the visible light signals are modulated.

Figure 1B:
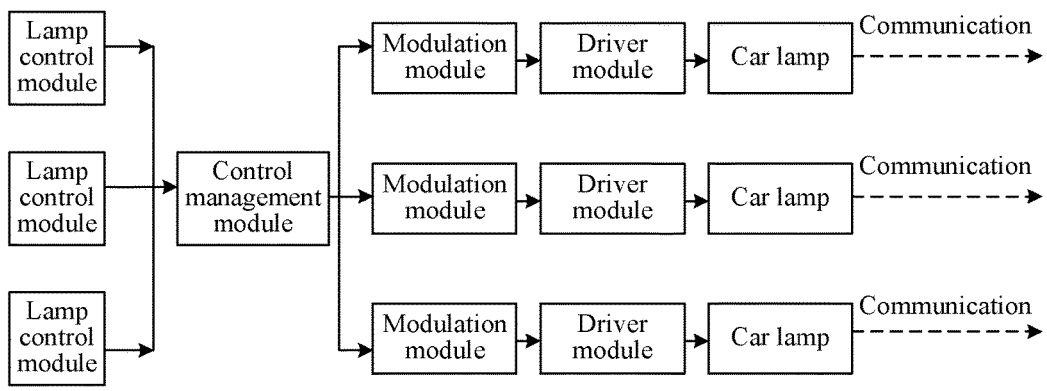
FIG. 1B is a modular schematic diagram of an entity for executing visible light-based communication according to an embodiment of the present invention.

In this embodiment of the present invention, when steps 100 to 130 are performed by a car, as shown in FIG. 1B, modules for executing steps from step 100 to step 120 may be separately as follows:

a lamp control module, where the module mainly controls operations corresponding to lamps, for example, turning a turn lamp switch, pressing a hazard warning button, and braking the car; a corresponding lamp is turned on by means of an operation of the lamp control module, and related information is sent to a control management module;

the control management module, where the module receives input from the lamp control module, and determines information about an operated lamp according to the input; and may further acquire information such as rate information, acceleration information, fuel capacity information of the car or information such as width information and height information of the car, and transmit the information to a corresponding modulation module;

the modulation module, where the module receives the related information that is from the control management module and that needs to be transmitted by using visible light, for example, lamp-related information, car-related information, or other information for communication between cars by using visible light, and modulates the information; specifically, the modulation module performs sampling and quantizing to obtain a binary bit stream, modulates the binary bit stream, and transmits the binary bit stream to a driver module; and the driver module, where the module converts a signal, of which the binary bit stream has been modulated, into a light intensity signal, and drives a corresponding lamp of the car to emit light.

Certainly, FIG. 1B is a schematic diagram of communication performed by multiple lamps. In actual applications, communication may be performed by using multiple lamps. Alternatively, communication may be performed by using one lamp, and in this case, a schematic diagram is shown in FIG. 1C.

In this embodiment of the present invention, there are multiple manners for sending the visible light signal carrying the processed related information, and optionally, the following manner may be used:

sending the visible light signal carrying the processed related information, so that the transport device receiving the visible light signal calculates a distance between two transport devices according to the related information and by using the following formula:

$$S = \sqrt{L^2 - (H2-H1)^2} = \text{(formula five)}$$

-continued
$$\sqrt{S_2^2 - \left(\frac{B2-B1}{2}\right)^2 - \left(\frac{S_2^2 - S_1^2}{2(B2-B1)}\right)^2 - (H2-H1)^2}$$

where B1 is a width between left and right tail lamps of a transport device sending the visible light signal;

H1 is a height, relative to the ground, of the tail lamps of the transport device sending the visible light signal;

B2 is a width (B2>B1) between width lamps of the transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

Figure 2B:
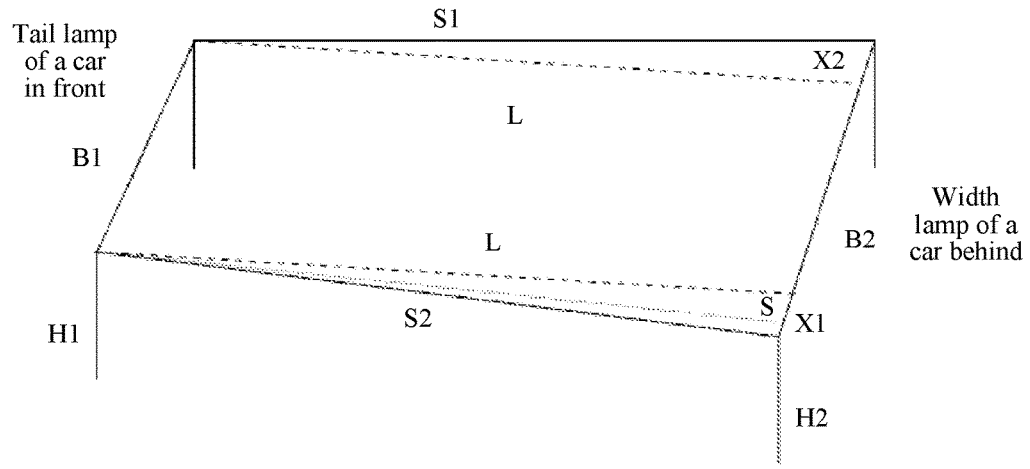
FIG. 2B is a schematic diagram of calculating a distance between two cars according to an embodiment of the present invention.

In an embodiment of the present invention, referring to FIG. 2A, this embodiment of the present invention provides another communication method that is based on a visible light source. A specific process of the method is as follows:

Step 200: Receive a visible light signal sent by a transport device and demodulate the visible light signal, where the demodulated visible light signal carries related information, which has been processed by using orthogonal sequences, of the transport device.

Step 210: Process the demodulated visible light signal by using the orthogonal sequences, to obtain, by means of demodulation, the related information of the transport device carried in the visible light signal, where the related information includes one of or any combination of performance information of the transport device, size information of the transport device, or identifier information of a visual light source of the transport device.

In this embodiment of the present invention, after the transport device receives the visible light signal, and before the visible light signal is demodulated, the following operation is further included:

performing optical-to-electrical conversion on the visible light signal to obtain a data signal, and then demodulating the data signal.

In this embodiment of the present invention, the demodulated visible light signal is processed by using the orthogonal sequences, and the related information of the transport device carried in the data signal may be obtained, for example, lamp information such as a car lamp message, car lamp ID information, car speed information, acceleration information, fuel capacity information, length information, and width information, or other car-related information.

In this embodiment of the present invention, after the related information of the transport device is obtained, a corresponding prompt is provided or a corresponding operation is performed according to the information.

For example, if brake-lamp lamp information is acquired, a brake module of the car may be triggered to decelerate; or if emergency-flashers information is acquired, a brake module of the car may be triggered to decelerate, and emergency flashers of the car about which the information is acquired are turned on.

In this embodiment of the present invention, there are multiple manners of demodulating the visible light signal. Optionally, the following manner may be used:

demodulating the visible light signal by using an on-off keying modulation scheme; or demodulating the visible light signal by using a pulse position modulation scheme; or demodulating the visible light signal by using a multi-carrier modulation scheme.

Certainly, other manners may also be used, which are not described in detail herein.

In this embodiment of the present invention, there are multiple manners of processing the demodulated visible light signal by using the orthogonal sequences. Optionally, the following manner may be used:

descrambling the demodulated visible light signal by using the orthogonal sequences; or demapping the demodulated visible light signal by using the orthogonal sequences.

In this embodiment of the present invention, the orthogonal sequences are generated based on a cyclic shift of a basic sequence.

In this embodiment of the present invention, the basic sequence may have multiple forms. Optionally, the form of the formula two may be used.

Similarly, the relationship that any one of the orthogonal sequences and the basic sequence satisfy may also have multiple forms. Optionally, the form of the formula three may be used.

After the related information of the transport device carried in the visible light signal is obtained by means of demodulation, the method further includes:

calculating a distance between two transport devices according to the related information and by using the following formula:

$$S = \sqrt{L^2 - (H2 - H1)^2} = \sqrt{S_2^2 - \left(\frac{B2 - B1}{2}\right)^2 - \left(\frac{S_2^2 - S_1^2}{2(B2 - B1)}\right)^2 - (H2 - H1)^2}$$

where B1 is a width between left and right tail lamps of the transport device sending the visible light signal;

H1 is a height, relative to the ground, of the tail lamps of the transport device sending the visible light signal;

B2 is a width (B2>B1) between width lamps of a transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

In the embodiments of the present invention, if steps 100 to 130 and steps 200 to 210 are all performed by a transport device, for example, a car, where steps 100 to 130 are performed by a car A, and steps 200 to 210 are performed by a car B, the car B may calculate a distance between the two cars according to the received related information of the car. Specifically, as shown in FIG. 2 B, a specific calculation manner may follow formula five:

$$S = \sqrt{L^2 - (H2 - H1)^2} = \sqrt{S_2^2 - \left(\frac{B2 - B1}{2}\right)^2 - \left(\frac{S_2^2 - S_1^2}{2(B2 - B1)}\right)^2 - (H2 - H1)^2}$$

where S is a distance between the two cars;

B1 is a width between left and right tail lamps of the car A;

H1 is a height, relative to the ground, of the tail lamps of the car A;

B2 is a width (B2>B1) between width lamps of the car B;

H2 is a distance from the ground to the width lamps of the car B;

S1 is a distance between the right tail lamp of the car A and a right width lamp of the car B;

S2 is a distance between the left tail lamp of the car A and the left width lamp of the car B;

L is a length of a perpendicular from a line connecting the tail lamps of the car A to a line connecting the width lamps of the car B;

X1 is a distance between left width lamp of the car B and an intersection point between the connection line between the width lamps of the car B and a perpendicular line, where the perpendicular line is from the left tail lamp of the car A to the connection line between the width lamps of the car B; and X2 is a distance between right width lamp of the car B and an intersection point between the connection line between the width lamps of the car B and a perpendicular line, where the perpendicular line is from the right tail lamp of the car A to the connection line between the width lamps of the car B, where $$B2=B1+X1+X2 \quad \text{(formula six)}$$

$$X1^2=S2^2-L^2 \quad \text{(formula seven)}$$

$$X2^2=S1^2-L^2 \quad \text{(formula eight)}$$

In this embodiment of the present invention, after the related information of the transport device carried in the visible light signal is obtained by means of demodulation, the following operation is included:

if the related information is brake-lamp lamp information, decelerating; or if the related information is emergency-flashers information, decelerating, and/or, triggering emergency flashers of the local transport device to turn on and sending a visible light signal carrying emergency-flashers lamp information.

To make the embodiments of the present invention more comprehensible, the following provides a specific application scenario and provides a further detailed description on a communication process that is based on a visible light source.

Figure 3:
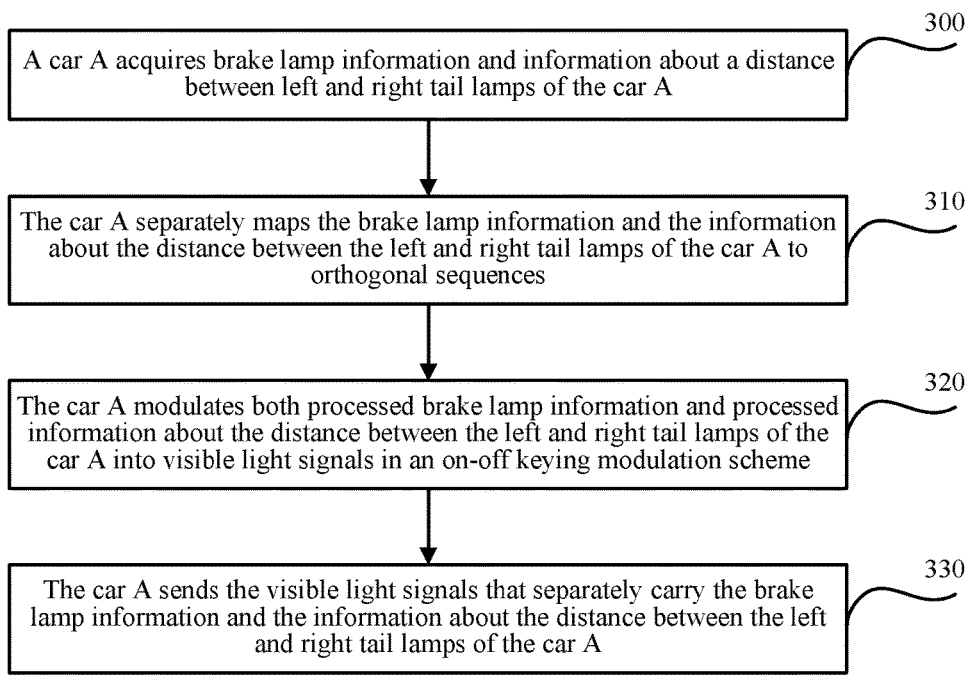
FIG. 3 shows an embodiment of visible light-based communication according to an embodiment of the present invention.

FIG. 3 shows a visible light signal sending process that is based on a visible light source.

Step 300: A car A acquires brake lamp information and information about a distance between left and right tail lamps of the car A.

Step 310: The car A separately maps the brake lamp information and the information about the distance between the left and right tail lamps of the car A to orthogonal sequences.

Step 320: The car A modulates both processed brake lamp information and processed information about the distance between the left and right tail lamps of the car A into visible light signals in an on-off keying modulation scheme.

Certainly, in this step, a pulse position modulation scheme or a multi-carrier modulation scheme may also be used to modulate mapped information to the visible light signals.

In this step, the visible light signal carrying the brake lamp information and the visible light signal carrying the information about the distance between the left and right tail lamps of the car A are separately transmitted by using two lamps.

Step 330: The car A sends the visible light signals that separately carry the brake lamp information and the information about the distance between the left and right tail lamps of the car A.

In this embodiment, if the car A does not separately map the brake lamp information and the information about the distance between the left and right tail lamps of the car A to the orthogonal sequences, that is, orthogonal sequence processing is not performed, the visible light signals that separately carry the brake lamp information and the information about the distance between the left and right tail lamps of the car A may interfere with each other, causing chaos, and the car B receiving the two visible light signals cannot obtain, by means of demodulation, information carried in either of the two visible light signals. Therefore, in this embodiment, when multiple light signals are received, information carried in each visible light signal can be accurately acquired.

Figure 4:
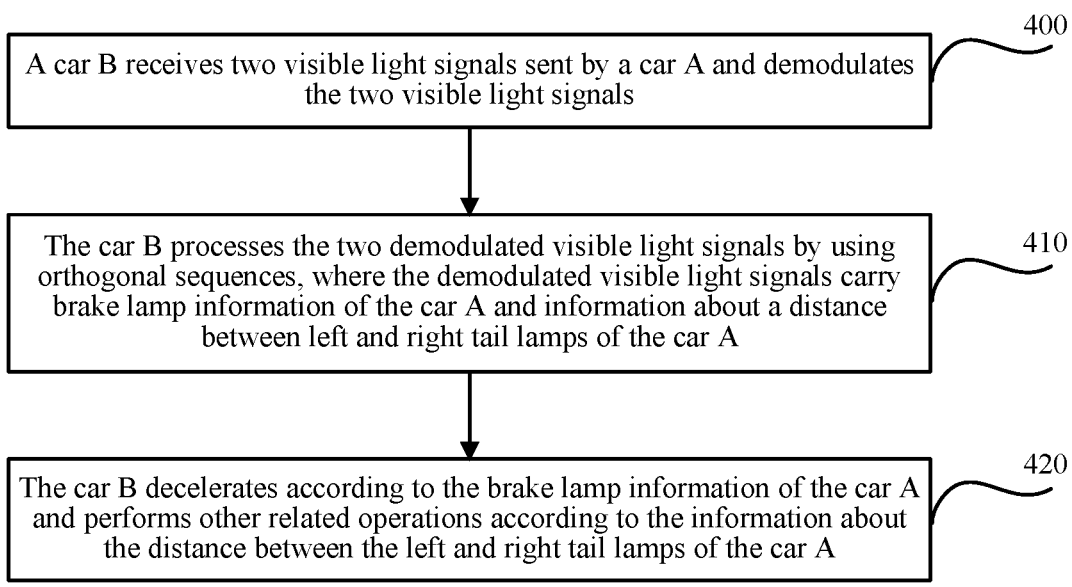
FIG. 4 shows an embodiment of visible light-based communication according to an embodiment of the present invention.

FIG. 4 shows a visible light signal receiving process that is based on a visible light source.

Step 400: The car B receives the two visible light signals sent by the car A and demodulates the two visible light signals.

Step 410: The car B processes the two demodulated visible light signals by using orthogonal sequences, where the demodulated visible light signals carry the brake lamp information of the car A and the information about the distance between the left and right tail lamps of the car A.

Step 420: The car B decelerates according to the brake lamp information of the car A and performs other related operations according to the information about the distance between the left and right tail lamps of the car A.

In this embodiment, because the car A separately maps the brake lamp information and the information about the distance between the left and right tail lamps to the orthogonal sequences, that is, orthogonal sequence processing is performed, the visible light signals that separately carry the brake lamp information and the information about the distance between the left and right tail lamps of the car A do not interfere with each other. The car B that receives the two visible light signals then processes the corresponding visible light signals according to the corresponding orthogonal sequences and can accurately acquire information carried in either of the two visible light signals. Therefore, in this embodiment, when multiple light signals are received, information carried in each visible light signal can be accurately acquired, which resolves a problem in the prior art.

Figure 5:
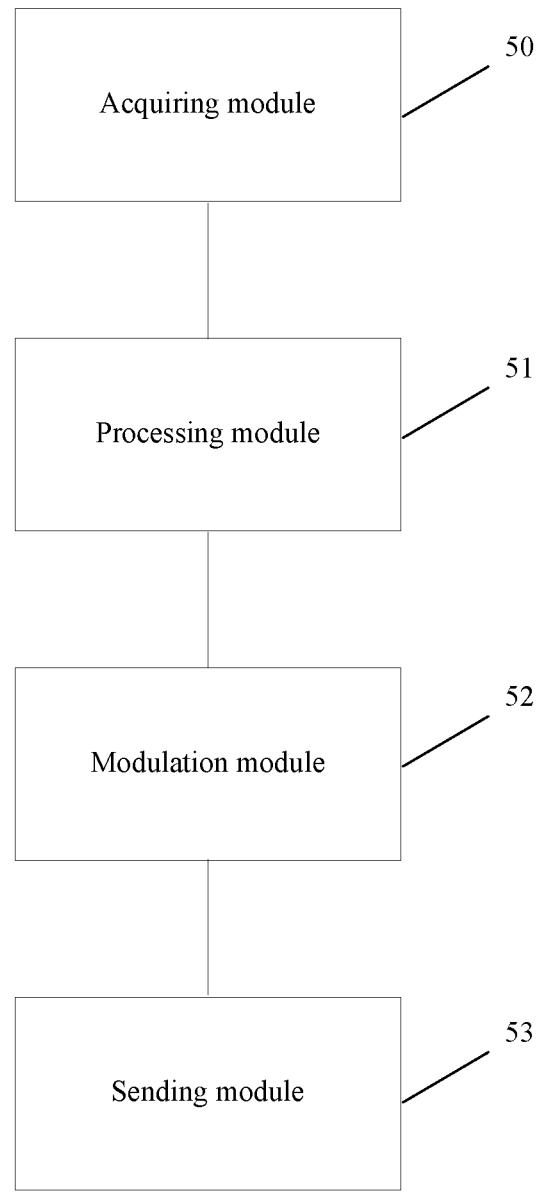
FIG. 5 is a first functional schematic structural diagram of a transport device according to an embodiment of the present invention.

Based on the foregoing technical solutions, referring to FIG. 5, an embodiment of the present invention provides a transport device. The transport device includes an acquiring module 50, a processing module 51, a modulation module 52, and a sending module 53.

The acquiring module 50 is configured to acquire related information of a transport device, where the related information includes one of or any combination of performance information of the transport device, size information of the transport device, or identifier information of a visual light source of the transport device.

The processing module 51 is configured to process the related information by using orthogonal sequences, to obtain processed related information.

The modulation module 52 is configured to modulate the processed related information to a visible light signal, so that the information is added to the visible light signal for transmission, and a transport device receiving the processed related information obtains, by means of demodulation based on orthogonality between the orthogonal sequences, the related information carried in the visible light signal, thereby canceling interference between multiple visible light signals.

The sending module 53 is configured to send the visible light signal carrying the processed related information.

In this embodiment of the present invention, optionally, the processing module 51 is specifically configured to:

scramble the related information by using the orthogonal sequences; or map the related information into the orthogonal sequences.

In this embodiment of the present invention, optionally, the orthogonal sequences used by the processing module 51 for processing are generated based on a cyclic shift of a basic sequence.

In this embodiment of the present invention, optionally, the orthogonal sequences used by the processing module 51 for processing are generated by using the basic sequence that is in the following form:

$$m(k) = \exp\left(\frac{j\pi r k^2}{N}\right)$$

where m(k) is the basic sequence;

N is a length of the basic sequence and is a positive integer;

k is any integer from 0 to N;

j is an imaginary unit; and r is any positive integer co-prime to N.

In this embodiment of the present invention, optionally, any one of the orthogonal sequences used by the processing module 51 for processing satisfies the following relationship with the basic sequence:

$$\sum_{k=0}^{N-1} m(k)m^*(k+\sigma)_{modN} = \begin{Bmatrix} N, \sigma = 0 \\ 0, \sigma \neq 0 \end{Bmatrix}$$

where m(k) is the basic sequence, and m*(k+σ) represents the orthogonal sequences;

N is a length of the basic sequence and is a positive integer;

k is any integer from 0 to N;

j is an imaginary unit; and r is any positive integer co-prime to N.

In this embodiment of the present invention, optionally, the modulation module 52 is specifically configured to:

modulate the processed related information to the visible light signal by using an on-off keying modulation scheme; or modulate the processed related information to the visible light signal by using a pulse position modulation scheme; or modulate the processed related information to the visible light signal by using a multi-carrier modulation scheme.

In this embodiment of the present invention, optionally, the sending module 53 is specifically configured to:

send the visible light signal carrying the processed related information, so that the transport device receiving the visible light signal calculates a distance between two transport devices according to the related information and by using the following formula:

$$S = \sqrt{L^2 - (H2 - H1)^2} = \sqrt{S_2^2 - \left(\frac{B2-B1}{2}\right)^2 - \left(\frac{S_2^2 - S_1^2}{2(B2-B1)}\right)^2 - (H2-H1)^2}$$

where B1 is a width between left and right tail lamps of a transport device sending the visible light signal;

H1 is a height, relative to the ground, of the tail lamps of the transport device sending the visible light signal;

B2 is a width (B2>B1) between width lamps of the transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

Figure 6:
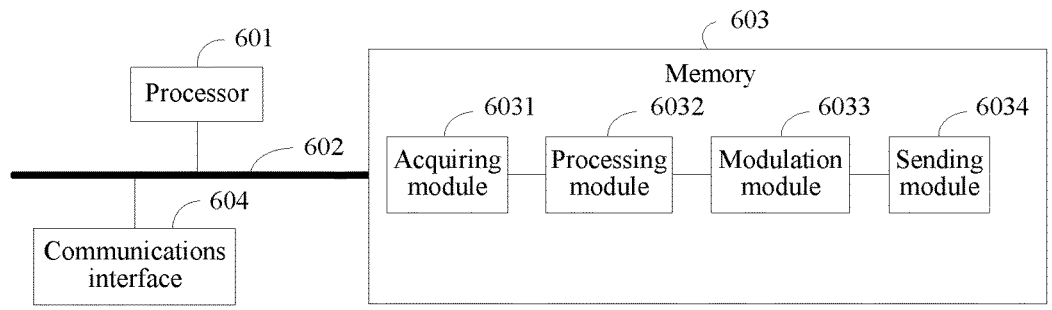
FIG. 6 is a first physical schematic structural diagram of a transport device according to an embodiment of the present invention.

As shown in FIG. 6, FIG. 6 is a physical structural diagram of a transport device according to an embodiment of the present invention. The transport device includes at least one processor 601, a communications bus 602, a memory 603, and at least one communications interface 604.

The communications bus 602 is configured to implement connection and communication between the foregoing components, and the communications interface 604 is configured to be connected to and communicate with a peripheral device.

The memory 603 is configured to store program code that needs to be executed. The program code may specifically include: an acquiring module 6031, a processing module 6032, a modulation module 6033, and a sending module 6034. When the foregoing modules are executed by the processor 601, the following functions are implemented:

The acquiring module 6031 is configured to acquire related information of a transport device, where the related information includes one of or any combination of performance information of the transport device, size information of the transport device, or identifier information of a visual light source of the transport device.

The processing module 6032 is configured to process the related information by using orthogonal sequences, to obtain processed related information.

The modulation module 6033 is configured to modulate the processed related information to a visible light signal, so that the information is added to the visible light signal for transmission, and a transport device receiving the processed related information obtains, by means of demodulation based on orthogonality between the orthogonal sequences, the related information carried in the visible light signal, thereby canceling interference between multiple visible light signals.

The sending module 6034 is configured to send the visible light signal carrying the processed related information.

Figure 7:
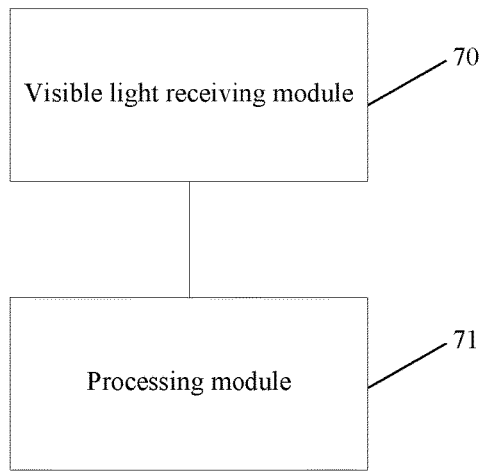
FIG. 7 is a second functional schematic structural diagram of a transport device according to an embodiment of the present invention.

Based on the foregoing technical solutions, referring to FIG. 7, this embodiment of the present invention provides another transport device. The transport device includes a visible light receiving module 70 and a processing module 71.

The visible light receiving module 70 is configured to receive a visible light signal sent by a transport device and demodulate the visible light signal, where the demodulated visible light signal carries related information, which has been processed by using orthogonal sequences, of the transport device.

The processing module 71 is configured to process the demodulated visible light signal by using the orthogonal sequences, to obtain, by means of demodulation, the related information of the transport device carried in the visible light signal, where the related information includes one of or any combination of performance information of the transport device, size information of the transport device, or identifier information of a visual light source of the transport device.

In this embodiment of the present invention, optionally, the visible light receiving module 70 is specifically configured to: demodulate the visible light signal by using an on-off keying modulation scheme; or demodulate the visible light signal by using a pulse position modulation scheme; or demodulate the visible light signal by using a multi-carrier modulation scheme.

In this embodiment of the present invention, optionally, the processing module 71 is specifically configured to:

descramble the demodulated visible light signal by using the orthogonal sequences; or demap the demodulated visible light signal by using the orthogonal sequences.

In this embodiment of the present invention, optionally, the orthogonal sequences used by the processing module 71 for processing are generated based on a cyclic shift of a basic sequence.

In this embodiment of the present invention, optionally, the orthogonal sequences used by the processing module 71 for descrambling are generated by using the basic sequence that is in the following form:

$$m(k) = \exp\left(\frac{j\pi r k^2}{N}\right)$$

where m(k) is the basic sequence;

N is a length of the basic sequence and is a positive integer;

k is any integer from 0 to N;

j is an imaginary unit; and r is any positive integer co-prime to N.

In this embodiment of the present invention, optionally, any one of the orthogonal sequences used by the processing module 71 for processing satisfies the following relationship with the basic sequence:

$$\sum_{k=0}^{N-1} m(k) m^*(k+\sigma)_{modN} = \begin{Bmatrix} N, \sigma = 0 \\ 0, \sigma \neq 0 \end{Bmatrix}$$

where m(k) is the basic sequence, and m*(k+σ) represents the orthogonal sequences;

N is a length of the basic sequence and is a positive integer;

k is any integer from 0 to N;

j is an imaginary unit; and r is any positive integer co-prime to N.

In this embodiment of the present invention, further, the transport device further includes a distance calculation module 72, where the distance calculation module 72 is specifically configured to:

calculate a distance between two transport devices according to the related information and by using the following formula:

$$S = \sqrt{L^2 - (H2-H1)^2} =$$

-continued $$\sqrt{S_2^2 - \left(\frac{B2-B1}{2}\right)^2 - \left(\frac{S_2^2 - S_1^2}{2(B2-B1)}\right)^2} - (H2-H1)^2$$

where B1 is a width between left and right tail lamps of the transport device sending the visible light signal;

H1 is a height, relative to the ground, of the tail lamps of the transport device sending the visible light signal;

B2 is a width (B2>B1) between width lamps of a transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and the width lamp of the transport device receiving the visible light signal;

L is a length of a perpendicular from a line connecting the tail lamps of the transport device sending the visible light signal to a line connecting the width lamps of the transport device receiving the visible light signal;

X1 is a distance from the left width lamp of the transport device receiving the visible light signal to an intersection point between the connection line between the width lamps of the transport device receiving the visible light signal and a perpendicular line, where the perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a perpendicular line, where the perpendicular line is from the right tail lamp of the transport device sending the visible light signal to the connection line between the width lamps of the transport device receiving the visible light signal.

In this embodiment of the present invention, further, the transport device further includes a control management module 73, where the control management module 73 is configured to:

if the related information obtained by means demodulation is brake-lamp lamp information, control the transport device to decelerate; or if the related information obtained by means of demodulation is emergency-flashers information, control the transport device to decelerate, and/or, trigger emergency flashers to turn on and send a visible light signal carrying emergency-flashers lamp information.

Figure 8:
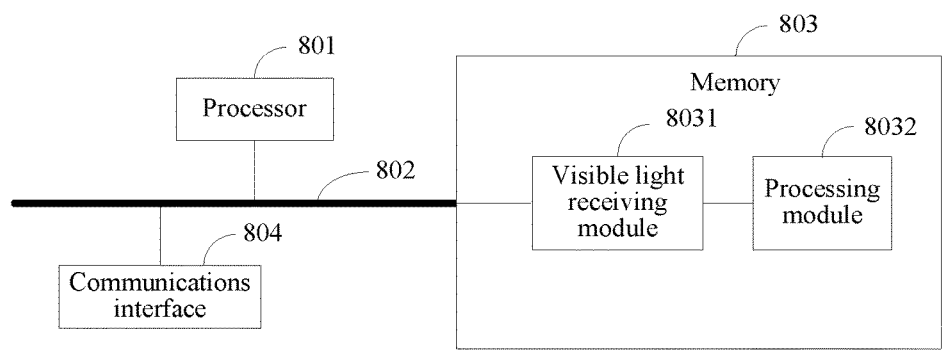
FIG. 8 is a second physical schematic structural diagram of a transport device according to an embodiment of the present invention.

As shown in FIG. 8, FIG. 8 is a physical structural diagram of a transport device according to an embodiment of the present invention. The transport device includes at least one processor 801, a communications bus 802, a memory 803, and at least one communications interface 804.

The communications bus 802 is configured to implement connection and communication between the foregoing components, and the communications interface 804 is configured to be connected to and communicate with a peripheral device.

The memory 803 is configured to store program code that needs to be executed. The program code may specifically include: a visible light receiving module 8031 and a processing module 8032. When the foregoing modules are executed by the processor 801, the following functions are implemented:

The visible light receiving module 8031 is configured to receive a visible light signal sent by a transport device and demodulate the visible light signal, where the demodulated visible light signal carries related information, which has been processed by using orthogonal sequences, of the transport device.

The processing module 8032 is configured to process the demodulated visible light signal by using the orthogonal sequences, to obtain, by means of demodulation, the related information of the transport device carried in the visible light signal, where the related information includes one of or any combination of performance information of the transport device, size information of the transport device, or identifier information of a visual light source of the transport device.

In conclusion, the embodiments of the present invention provide a communication method that is based on a visible light source. The method includes: acquiring related information of a transport device; and processing the related information by using orthogonal sequences, modulating the processed related information to a visible light signal, and sending the visible light signal. In the solution, before a visible light signal is generated, related information carried in the visible light signal is processed by using orthogonal sequences, and different visible light signals processed by using the orthogonal sequences do not interfere with each other. In this way, when an optical receiving device receives multiple visible light signals, because the received multiple visible light signals are orthogonal to each other, even if the orthogonal multiple visible light signals interfere with each other, a transport device receiving the multiple visible light signals can demodulate the multiple visible light signals by using orthogonality, thereby canceling interference. Therefore, the visible light signals can be accurately received, which resolves a problem in the prior art that visible light signals cannot be accurately received due to interference between multiple visible light signals.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A visible light-based communication method, the method comprising:
   acquiring related information of a transport device, wherein the related information comprises one of or any combination of performance information of the transport device, size information of the transport device, or identifier information of a visual light source of the transport device;
   processing the related information by using orthogonal sequences, to obtain processed related information;
   modulating the processed related information to a visible light signal, such that the processed related information is added to the visible light signal for transmission, the processed related information enabling a transport device receiving the processed related information to obtain, using demodulation based on orthogonality between the orthogonal sequences, the related information carried in the visible light signal, thereby canceling interference between multiple visible light signals;
   sending the visible light signal carrying the processed related information;
   wherein the orthogonal sequences are generated based on a cyclic shift of a basic sequence; and
   wherein any one of the orthogonal sequences satisfies the following relationship with the basic sequence:

$$\sum_{k=0}^{N-1} m(k)m^*(k+\sigma)_{modN} = \begin{Bmatrix} N, \sigma = 0 \\ 0, \sigma \neq 0 \end{Bmatrix}$$

wherein m(k) is the basic sequence, and m*(k+σ) represents the orthogonal sequences;
   N is a length of the basic sequence and is a positive integer; and
   k is any integer from 0 to N.

2. The method according to claim 1, wherein processing the related information by using orthogonal sequences comprises:

scrambling the related information by using the orthogonal sequences; or mapping the related information into the orthogonal sequences.

3. The method according to claim 1, wherein modulating the processed related information to a visible light signal comprises:

modulating the processed related information to the visible light signal by using an on-off keying modulation scheme; or modulating the processed related information to the visible light signal by using a pulse position modulation scheme; or modulating the processed related information to the visible light signal by using a multi-carrier modulation scheme.

4. The method according to claim 1, wherein sending the visible light signal carrying the processed related information comprises:

sending the visible light signal carrying the processed related information, the processed related information enabling the transport device receiving the visible light signal to calculate a distance between two transport devices according to the processed related information and by using the following formula:

$$S = \sqrt{L^2 - (H2 - H1)^2} = \sqrt{S_2^2 - \left(\frac{B2-B1}{2}\right)^2 - \left(\frac{S_2^2 - S_1^2}{2(B2-B1)}\right)^2 - (H2-H1)^2}$$

wherein B1 is a width between left and right tail lamps of a transport device sending the visible light signal;

H1 is a height, relative to the ground, of the tail lamps of the transport device sending the visible light signal;

B2 is a width (B2>B1) between width lamps of the transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and a left width lamp of the transport device receiving the visible light signal;

L is a length of a first perpendicular line from a line connecting the tail lamps of the transport device sending the visible light signal to a line connecting the width lamps of the transport device receiving the visible light signal;

X1 is a distance from the left width lamp of the transport device receiving the visible light signal to an intersection point between a connection line between the width lamps of the transport device receiving the visible light signal and a second perpendicular line, wherein the second perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a third perpendicular line, wherein the third perpendicular line is from the right tail lamp of the transport device sending the visible light signal to the connection line between the width lamps of the transport device receiving the visible light signal.

5. A visible light-based communication method, the method comprising:

receiving a visible light signal sent by a transport device and demodulating the visible light signal, wherein the demodulated visible light signal carries related information, which has been processed by using orthogonal sequences, of the transport device;

processing the demodulated visible light signal by using the orthogonal sequences, to obtain, using demodulation, the related information of the transport device carried in the visible light signal, wherein the related information comprises performance information of the transport device, size information of the transport device, or identifier information of a visual light source of the transport device; and wherein any one of the orthogonal sequences satisfies the following relationship with the basic sequence:

$$\sum_{k=0}^{N-1} m(k)m^*(k+\sigma)_{modN} = \left\{ \begin{array}{l} N, \sigma = 0 \\ 0, \sigma \neq 0 \end{array} \right\}$$

wherein m(k) is the basic sequence, and m*(k+σ) represents the orthogonal sequences;

N is a length of the basic sequence and is a positive integer; and k is any integer from 0 to N.

6. The method according to claim 5, wherein demodulating the visible light signal comprises:

demodulating the visible light signal by using an on-off keying modulation scheme; or demodulating the visible light signal by using a pulse position modulation scheme; or demodulating the visible light signal by using a multi-carrier modulation scheme.

7. The method according to claim 5, wherein processing the demodulated visible light signal by using the orthogonal sequences comprises:

descrambling the demodulated visible light signal by using the orthogonal sequences; or demapping the demodulated visible light signal by using the orthogonal sequences.

8. The method according to claim 6, wherein the orthogonal sequences are generated based on a cyclic shift of a basic sequence.

9. The method according to claim 5, further comprising:

after the related information of the transport device carried in the visible light signal is obtained using demodulation, calculating a distance between two transport devices according to the related information and by using the following formula:

$$S = \sqrt{L^2 - (H2 - H1)^2} = \sqrt{S_2^2 - \left(\frac{B2-B1}{2}\right)^2 - \left(\frac{S_2^2 - S_1^2}{2(B2-B1)}\right)^2 - (H2-H1)^2}$$

wherein B1 is a width between left and right tail lamps of the transport device sending the visible light signal;

H1 is a height, relative to the ground, of the tail lamps of the transport device sending the visible light signal;

B2 is a width (B2>B1) between width lamps of a transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and a left width lamp of the transport device receiving the visible light signal;

L is a length of a first perpendicular line from a line connecting the tail lamps of the transport device sending the visible light signal to a line connecting the width lamps of the transport device receiving the visible light signal;

X1 is a distance from the left width lamp of the transport device receiving the visible light signal to an intersection point between a connection line between the width lamps of the transport device receiving the visible light signal and a second perpendicular line, wherein the second perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a third perpendicular line, wherein the third perpendicular line is from the right tail lamp of the transport device sending the visible light signal to the connection line between the width lamps of the transport device receiving the visible light signal.

10. The method according to claim 5, further comprising:
after the related information of the transport device carried in the visible light signal is obtained using demodulation:
when the related information is brake-lamp lamp information, decelerating; or
when the related information is emergency-flashers information, at least one of:
decelerating, and
triggering emergency flashers of the transport device sending the visible light signal to turn on and sending a visible light signal carrying emergency-flashers lamp information.

11. A transport device, comprising:
at least one processor configured to:
acquire related information of a transport device, wherein the related information comprises performance information of the transport device, size information of the transport device, or identifier information of a visual light source of the transport device;
process the related information by using orthogonal sequences, to obtain processed related information;
modulate the processed related information to a visible light signal, such that the processed related information is added to the visible light signal for transmission, the processed related information enabling a transport device receiving the processed related information to obtain, using demodulation based on orthogonality between the orthogonal sequences, the related information carried in the visible light signal, thereby canceling interference between multiple visible light signals; and
control the transport device to send the visible light signal carrying the processed related information; and
wherein any one of the orthogonal sequences satisfies the following relationship with a basic sequence:

$$\sum_{k=0}^{N-1} m(k)m^*(k+\sigma)_{modN} = \left\{ \begin{array}{l} N, \sigma = 0 \\ 0, \sigma \neq 0 \end{array} \right\}$$

wherein m(k) is the basic sequence, and m*(k+σ) represents the orthogonal sequences;

N is a length of the basic sequence and is a positive integer;

k is any integer from 0 to N.

12. The transport device according to claim 11, wherein the at least one processor is configured to:
scramble the related information by using the orthogonal sequences; or
map the related information into the orthogonal sequences.

13. The transport device according to claim 11, wherein the orthogonal sequences used by the at least one processor for processing are generated based on a cyclic shift of a basic sequence.

14. The transport device according to claim 11, wherein the at least one processor is configured to:
modulate the processed related information to the visible light signal by using an on-off keying modulation scheme; or
modulate the processed related information to the visible light signal by using a pulse position modulation scheme; or
modulate the processed related information to the visible light signal by using a multi-carrier modulation scheme.

15. The transport device according to claim 11, wherein the at least one processor is configured to:
send the visible light signal carrying the processed related information, the processed related information enabling the transport device receiving the visible light signal to calculate a distance between two transport devices according to the processed related information and by using the following formula:

$$S = \sqrt{L^2 - (H2-H1)^2} = \sqrt{S_2^2 - \left(\frac{B2-B1}{2}\right)^2 - \left(\frac{S_2^2 - S_1^2}{2(B2-B1)}\right)^2 - (H2-H1)^2}$$

wherein B1 is a width between left and right tail lamps of a transport device sending the visible light signal;

H1 is a height, relative to the ground, of the tail lamps of the transport device sending the visible light signal;

B2 is a width (B2>B1) between width lamps of the transport device receiving the visible light signal;

H2 is a distance from the ground to the width lamps of the transport device receiving the visible light signal;

S1 is a distance between the right tail lamp of the transport device sending the visible light signal and a right width lamp of the transport device receiving the visible light signal;

S2 is a distance between the left tail lamp of the transport device sending the visible light signal and a left width lamp of the transport device receiving the visible light signal;

L is a length of a first perpendicular line from a line connecting the tail lamps of the transport device sending the visible light signal to a line connecting the width lamps of the transport device receiving the visible light signal;

X1 is a distance from the left width lamp of the transport device receiving the visible light signal to an intersection point between a connection line between the width lamps of the transport device receiving the visible light signal and a second perpendicular line, wherein the second perpendicular line is from the left tail lamp of the transport device sending the visible light signal to the connection line between the width lamps of the transport device receiving the visible light signal; and X2 is a distance from the right width lamp of the transport device receiving the visible light signal to an intersection point between the connection line between the width lamps of the transport device receiving the visible light signal and a third perpendicular line, wherein the third perpendicular line is from the right tail lamp of the transport device sending the visible light signal to the connection line between the width lamps of the transport device receiving the visible light signal.

16. A visible light-based communication transport device, comprising:
at least one processor configured to:
receive a visible light signal sent by a transport device and demodulate the visible light signal, wherein the demodulated visible light signal carries related information, which has been processed by using orthogonal sequences, of the transport device; and
process the demodulated visible light signal by using the orthogonal sequences, to obtain, using demodulation, the related information of the transport device carried in the visible light signal, wherein the related information comprises performance information of the transport device, size information of the transport device, or identifier information of a visual light source of the transport device; and
wherein any one of the orthogonal sequences satisfies the following relationship with the basic sequence:

$$\sum_{k=0}^{N-1} m(k) m^*(k+\sigma)_{modN} = \begin{Bmatrix} N, \sigma = 0 \\ 0, \sigma \neq 0 \end{Bmatrix}$$

wherein m(k) is the basic sequence, and m*(k+σ) represents the orthogonal sequences;
N is a length of the basic sequence and is a positive integer;
k is any integer from 0 to N.

17. The transport device according to claim 16, wherein the at least one processor is configured to:
demodulate the visible light signal by using an on-off keying modulation scheme; or
demodulate the visible light signal by using a pulse position modulation scheme; or
demodulate the visible light signal by using a multi-carrier modulation scheme.

18. The transport device according to claim 16, wherein the at least one processor is configured to:
descramble the demodulated visible light signal by using the orthogonal sequences; or
demap the demodulated visible light signal by using the orthogonal sequences.

19. The transport device according to claim 17, wherein the orthogonal sequences used by the at least one processor for processing are generated based on a cyclic shift of a basic sequence.

20. The transport device according to claim 16, wherein the at least one processor is configured to:
calculate a distance between two transport devices according to the related information and by using the following formula:

$$S = \sqrt{L^2 - (H2 - H1)^2} = \sqrt{S_2^2 - \left(\frac{B2 - B1}{2}\right)^2 - \left(\frac{S_2^2 - S_1^2}{2(B2 - B1)}\right)^2 - (H2 - H1)^2}$$

wherein B1 is a width between left and right tail lamps of the transport device sending the visible light signal;
H1 is a height, relative to the ground, of the tail lamps of the transport device sending the visible light signal;
B2 is a width (B2>B1) between width lamps of a transport device receiving the visible light signal;
H2 is a distance from the ground to the width lamps of the transport device receiving the visible light signal;
S1 is a distance between the right tail lamp of the transport device sending the visible light signal and a right width lamp of the transport device receiving the visible light signal;
S2 is a distance between the left tail lamp of the transport device sending the visible light signal and s left width lamp of the transport device receiving the visible light signal;
L is a length of a first perpendicular line from a line connecting the tail lamps of the transport device sending the visible light signal to a line connecting the width lamps of the transport device receiving the visible light signal;
X1 is a distance from the left width lamp of the transport device receiving the visible light signal to an intersection point between a connection line between the width lamps of the transport device receiving the visible light signal and a second perpendicular line, wherein the second perpendicular line is from the left tail lamp of the transport device sending the visible light signal to the connection line between the width lamps of the transport device receiving the visible light signal; and
X2 is a distance from the right width lamp of the transport device receiving the visible light signal to an intersection point between the connection line between the width lamps of the transport device receiving the visible light signal and a third perpendicular line, wherein the third perpendicular line is from the right tail lamp of the transport device sending the visible light signal to the connection line between the width lamps of the transport device receiving the visible light signal.

21. The transport device according to claim 16, wherein the at least one processor is configured to:
    when the related information obtained by demodulation is brake-lamp lamp information, control the transport device to decelerate; or
    when the related information obtained by demodulation is emergency-flashers information, at least one of:
        control the transport device to decelerate, and
        trigger emergency flashers to turn on and send a visible light signal carrying emergency-flashers lamp information.

* * * * *